US012762469B1

(12) United States Patent
Bannihatti Kumar et al.

(10) Patent No.: US 12,762,469 B1
(45) Date of Patent: Oct. 13, 2026

(54) UNSUPERVISED NEURAL STYLISTIC TEXT GENERATION

(71) Applicant: Amazon Technologies, Inc., Seattle, WA (US)

(72) Inventors: Vinayshekhar Bannihatti Kumar, Santa Clara, CA (US); Rashmi Gangadharaiah, San Jose, CA (US); Dan Roth, Philadelphia, PA (US)

(73) Assignee: Amazon Technologies, Inc., Seattle, WA (US)

(*) Notice: Subject to any disclaimer, the term of this patent is extended or adjusted under 35 U.S.C. 154(b) by 1000 days.

(21) Appl. No.: 17/935,455

(22) Filed: Sep. 26, 2022

(51) Int. Cl.
*G06N 3/045* (2023.01)
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS 10,152,970 B1 * 12/2018 Olabiyi ................... G06F 40/35
10,503,834 B2 * 12/2019 Bachrach .............. G06F 40/186
10,679,626 B2 * 6/2020 Aarabi .................... G06F 16/48
11,475,211 B1 * 10/2022 Baughman ............ G06F 40/166
11,669,699 B2 * 6/2023 Xia ...................... G06N 3/0475
704/9
11,842,205 B2 * 12/2023 Awadallah ................ G06F 8/30
2019/0385609 A1 * 12/2019 Olabiyi .................... G06F 40/35
2021/0027770 A1 * 1/2021 Olabiyi ................... G06F 40/30
2022/0237368 A1 * 7/2022 Tran ......................... G06F 21/32
2022/0335114 A1 * 10/2022 Wu ......................... G06F 21/36
2022/0414737 A1 * 12/2022 Wang ................. G06Q 30/0627
2023/0379645 A1 * 11/2023 Nongpiur ................. G06N 3/09
2025/0047295 A1 * 2/2025 Galvin ................. G06N 3/0455
2025/0258851 A1 * 8/2025 Lewis .................... G06N 20/00
2025/0342398 A1 * 11/2025 Li .......................... G06N 20/00
2025/0355656 A1 * 11/2025 Khalil .................... G06N 20/00

FOREIGN PATENT DOCUMENTS

CN 109829537 A * 5/2019 ........... G06V 30/245
CN 109190722 B * 5/2021 ........... G06B 30/245
CN 115204186 A * 10/2022 ............... G06N 5/04
CN 115408502 A * 11/2022 ............. G06F 40/30
(Continued)

OTHER PUBLICATIONS

Alec Radford et al., Language Models are Unsupervised Multitask Learners, 2019, Language models are unsupervised multitask learners. OpenAI 784 blog, 1(8):9.
(Continued)

*Primary Examiner* — Hassan Mrabi
(74) *Attorney, Agent, or Firm* — Nicholson DeVos Webster & Elliott LLP

(57) ABSTRACT

Techniques for training a stylistic response generator and/or using a stylistic response generator are described. In some examples, the stylistic response generator is trained by receiving a request to train a stylistic response generator, the request to include an indication of a plurality of styles to use to train the stylistic response generator and then training the stylistic response generator to generate responses according to the plurality of styles.

20 Claims, 12 Drawing Sheets

(56) References Cited

FOREIGN PATENT DOCUMENTS

| | | | | | |
|---|---|---|---|---|---|
| CN | 120525079 | A | * | 8/2025 | G06F 18/23 |
| WO | WO-2021046540 | A1 | * | 3/2021 | G06N 3/048 |
| WO | WO-2025160471 | A1 | * | 7/2025 | G06N 3/0464 |

OTHER PUBLICATIONS

Alicia Y. Tsai et al., Style Control for Schema-Guided Natural Language Generation, Sep. 24, 2021, https://arxiv.org/abs/2109.12211.
Bakhtiyar Syed et al., Adapting Language Models for Non-Parallel Author-Stylized Rewriting, Oct. 31, 2020, http://arxiv.org/abs/1909.09962.
Chenyang Huang et al., Automatic Dialogue Generation with Expressed Emotions, Jun. 1, 2018, 49-54, https://aclanthology.org/N18-2008/.
Chin-Yew Lin et al., ROUGE: A Package for Automatic Evaluation of Summaries, 74-81, https://aclanthology.org/W04-1013/.
Chuang Gan et al., StyleNet: Generating Attractive Visual Captions with Styles, Jul. 21, 2017, https://openaccess.thecvf.com/content_cvpr_2017/papers/Gan_StyleNet_Generating_Attractive_CVPR_2017_paper.pdf.
David D. McDonald et al., A computational theory of prose style for natural language generation, Mar. 27, 1985, https://dl.acm.org/doi/10.3115/976931.976958.
Di Jin et al., Deep Learning for Text Style Transfer: A Survey, Dec. 24, 2020, http://arxiv.org/abs/2011.00416.
Di Jin et al., Hooks in the Headline: Learning to Generate Headlines with Controlled Styles, Apr. 30, 2020, https://arxiv.org/abs/2004.01980.
Dimitra Gkatzia et al., Data-to-Text Generation Improves Decision-Making Under Uncertainty, Jul. 18, 2017, 1-16, https://ieeexplore.ieee.org/document/7983470.
Ehud Reiter et al., Choosing words in computer-generated weather forecasts, Apr. 16, 2018, https://arxiv.org/abs/1803.06535.
Ilya Sutskever et al., Sequence to Sequence Learning with Neural Networks, Dec. 14, 2014.
Ion Androutsopoulos et al., A Survey of Paraphrasing and Textual Entailment Methods, Dec. 22, 2009, 1-40, https://arxiv.org/abs/0912.3747.
Jacob Devlin et al., BERT: Pre-training of Deep Bidirectional Transformers for Language Understanding, Oct. 11, 2018, 1-14, https://arxiv.org/abs/1810.04805.
Jad Kabbara et al., Stylistic Transfer in Natural Language Generation Systems Using Recurrent Neural Networks, Nov. 5, 2016, 43-47.
Jiaao Chen et al., Incorporating Structured Commonsense Knowledge in Story Completion, Jan. 1, 2019, 1-8, https://arxiv.org/abs/1811.00625.
Jian Guan et al., Story Ending Generation with Incremental Encoding and Commonsense Knowledge, Dec. 2, 2018, 1-10, https://arxiv.org/abs/1808.10113.
Jian Guan et al., Story Ending Generation with Incremental Encoding and Commonsense Knowledge, Jul. 17, 2019, 6473-6480, vol. 33, https://ojs.aaai.org/index.php/AAAI/article/view/4612/4490.
Jonas Pfeiffer et al., MAD-X: An Adapter-Based Framework for Multi-Task Cross-Lingual Transfer, Oct. 6, 2020, https://arxiv.org/abs/2005.00052.
Junxian He et al., Towards a Unified View of Parameter-Efficient Transfer Learning, Dec. 22, 2021, http://arXiv:2110.04366.
Kalpesh Krishna et al., Reformulating Unsupervised Style Transfer as Paraphrase Generation, Oct. 12, 2020, https://arxiv.org/pdf/2010.05700.
Kishore Papineni et al., BLEU: a Method for Automatic Evaluation of Machine Translation, Jul. 1, 2002, 311-318.
Kurt Shuster et al., Engaging Image Captioning via Personality, Mar. 20, 2019, 12516-12526, https://arxiv.org/ pdf/1810.10665.
Lili Mou et al., Stylized Text Generation: Approaches and Applications, Jul. 5, 2020, 19-22, https://doi.org/10.18653/v1/2020.acl-tutorials.5.
Minh-Thang Luong et al., Effective Approaches to Attention-based Neural Machine Translation, Sep. 20, 2015, https://arxiv.org/pdf/1508.04025.
Nanyun Peng et al., Towards Controllable Story Generation, Jun. 5, 2018, 43-49.
Nasrin Mostafazadeh et al., A Corpus and Cloze Evaluation for Deeper Understanding of Commonsense Stories, Apr. 6, 2016.
Neil Houlsby et al., Parameter-Efficient Transfer Learning for NLP, Jun. 13, 2019, 2790-2799.
Nitin Madnani et al., Generating Phrasal and Sentential Paraphrases: A Survey of Data-Driven Methods, Mar. 7, 2010, https://doi.org/10.1162/coli_a_00002.
Prakhar Gupta et al., WriterForcing: Generating more interesting story endings, Aug. 1, 2019, School of Computer Science CarnegieMellon University Pittsburgh, PA, 117-126, https://doi.org/10.18653/v1/W19-3413.
Prakhar Gupta et al., WriterForcing: Generatingmore interesting story endings, Jul. 18, 2019, http://arXiv:1907.08259.
Qingfu Zhu et al., Neural Stylistic Response Generation with Disentangled Latent Variables, Aug. 2021, https://aclanthology.org/2021.acl-long. 339/.
Rabeeh Karimi Mahabadi et al.,, COMPACTER: Efficient Low-Rank Hypercomplex Adapter Layers, Nov. 27, 2021, 1-18.
Ramakrishna Vedantam et al., CIDEr: Consensus-based Image Description Evaluation, 2015, 4566-4575.
Rishi Sharma et al., Tackling the Story Ending Biases in The Story Cloze Test, Jul. 15, 2018, 752-757.
Shrimai Prabhumoye et al., Style Transfer Through Back-Translation, May 24, 2018, https://arxiv.org/abs/1804.09000.
Somayajulu G. Sripada et al., Lessons from Deploying NLG Technology for Marine Weather Forecast Text Generation, 2004, https://scispace.com/pdf/lessons-from-deploying-nlg-technology-for-marine-weather-4a4dx8137s.pdf.
Sudha Rao et al., Dear Sir or Madam, May I Introduce the GYAFC Dataset: Corpus, Benchmarks and Metrics for Formality Style Transfer, Apr. 6, 2018, http://arxiv.org/abs/1803.06535.
Tianxiao Shen et al., Style Transfer from Non-Parallel Text by Cross-Alignment, Nov. 6, 2017, http://arxiv.org/abs/1705.09655.
Tong Niu et al., Polite Dialogue GenerationWithout Parallel Data, Jun. 1, 2018, 373-389.
Tong Niu, Polite Dialogue Generation Without Parallel Data, May 18, 2018, https://arxiv.org/pdf/1805.03162.
Tuva Lunde Smestad et al., Chatbot Personalities Matters Improving the user experience of chatbot interfaces, Oct. 26, 2018, https://conversations2018.wordpress.com/wp-content/uploads/2018/10/conversations_2018_paper_11_preprint1.pdf.
Ximing Lu et al., NEUROLOGIC AFesque Decoding: Constrained Text Generation with Lookahead Heuristics, Dec. 6, 2021.
Ximing Lu et al., NEUROLOGIC Decoding: (Un)supervised Neural Text Generation with Predicate Logic Constraints, Oct. 24, 2020, https://arxiv.org/pdf/2010.12884.
Ye Zhang et al., SHAPED: Shared-Private Encoder-Decoder for Text Style Adaptation, Apr. 11, 2018, https://arxiv.org/abs/1804.04093.
Zhiting Hu et al., Toward Controlled Generation of Text, Jul. 11, 2017, https://arxiv.org/abs/1703.00955.

* cited by examiner

UNSUPERVISED NEURAL STYLISTIC TEXT GENERATION

BACKGROUND

Research has shown that personality is a key driver to improve engagement and user experience in conversational systems. Conversational agents should also maintain a consistent persona to have an engaging conversation with a user. However, text generation datasets are often crowd sourced and thereby have an averaging effect where the style of the generation model is an average style of all the crowd workers that have contributed to the dataset.

BRIEF DESCRIPTION OF DRAWINGS

Various examples in accordance with the present disclosure will be described with reference to the drawings, in which.

DETAILED DESCRIPTION

The present disclosure relates to methods, apparatus, systems, and non-transitory computer-readable storage media for at least generating stylistic responses and/or training of a model to generate stylistic responses.

Developing models that are capable of producing content relevant and stylistic responses is crucial in conversational artificial intelligence (AI) systems. As such, there is a need to train machine learning models that not only produce content that is relevant but also engage with humans in the style of their choice. State of the art generation models exhibit inconsistent personas as these models are trained on data from crowd workers having multiple personalities. A way to circumvent this problem is to collect parallel data for each of the persona you want to associate with the agent and train the dialog generation/text generation component on that task response generation conditioned on each persona. However, that is not possible in all scenarios and we need an efficient way to transfer the style attributes from monolingual styles that are present in different domains. Additionally, such an approach is expensive, time consuming. and not scalable. Additionally, some approaches do not have style specific parameters in the model and use the same set of parameters to encode both the style as well as the content.

Detailer herein is a mechanism to transfer style attributes from a style specific textual corpus. In particular, described herein are examples that target a task of response (e.g., story ending, conversation ending) generation from based on corpus of data (e.g., conversations, stories, etc.) where a stylized responses is generated based at least in part on a chosen style/persona.

Figure 1:
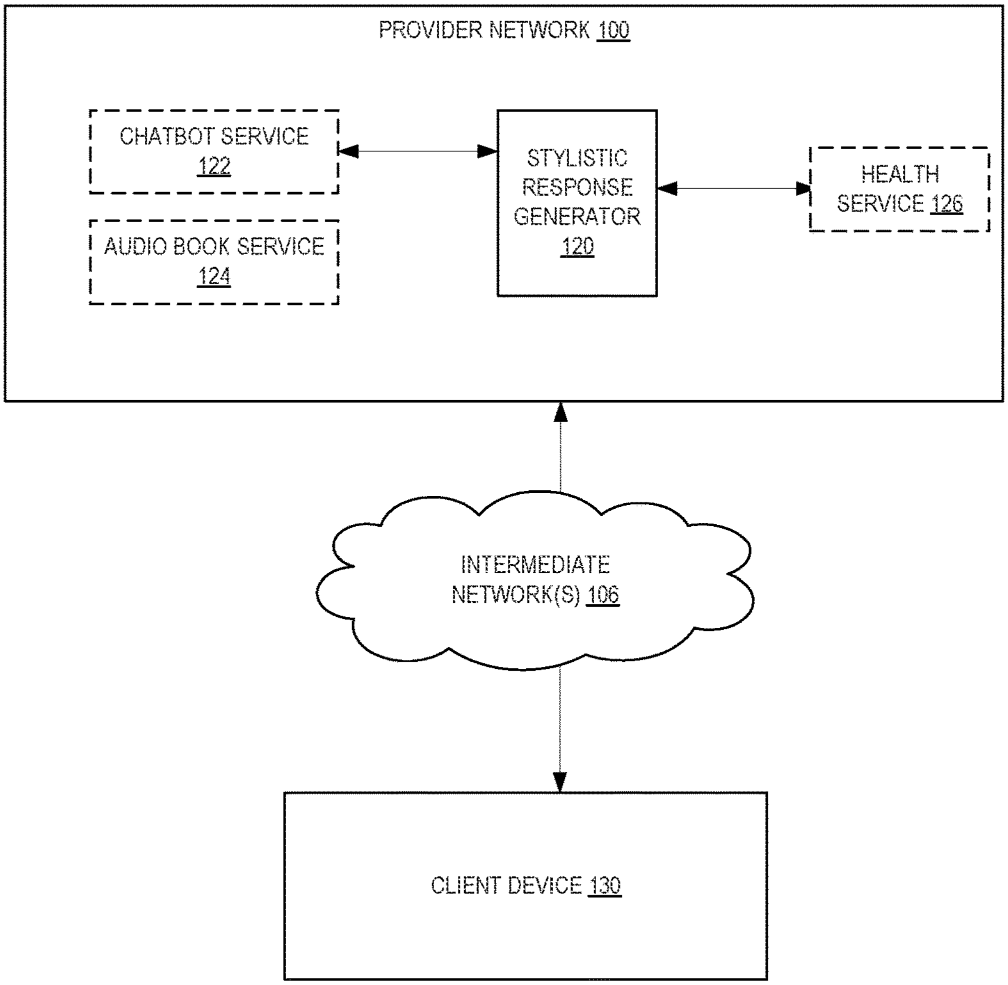
FIG. 1 illustrates examples of a stylistic response generator and its usage.

FIG. 1 illustrates examples of a stylistic response generator and its usage. In this example, the stylistic response generator 120 is a service of a provider network 100. The provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

The stylistic generator 120 generates responses or endings to conversations in a particular style. For example, the stylistic generator 120 may generate a positive ending to a conversation or story, or a negative ending to the same conversation or story. The particular style may be inferred or learned from previous interactions (e.g., a current or past context) or provided by a request (either a user request or provided by an entity such as a chatbot service 122). In some examples, one or more service such as an audio book service 124, a health service 126, or a chatbot service 122 interacts with the stylistic generator 120 to generate responses or endings. For example, a user may interact with the chatbot service 122 using a client device 130 and may want the chatbot to reply in a style (e.g., informal) that the user is most comfortable with. Or a user may interact with a health service 126 where stylistic responses translate technical language to more user-friendly language. In other examples, the stylistic generator 120 is not a service, but is a part of a software program such as a text-to-speech reader.

The description of the next few figures is relevant to the training of the model used by a stylistic response generator. In particular, the training of the model to be able to respond with a particular style.

Figure 2:
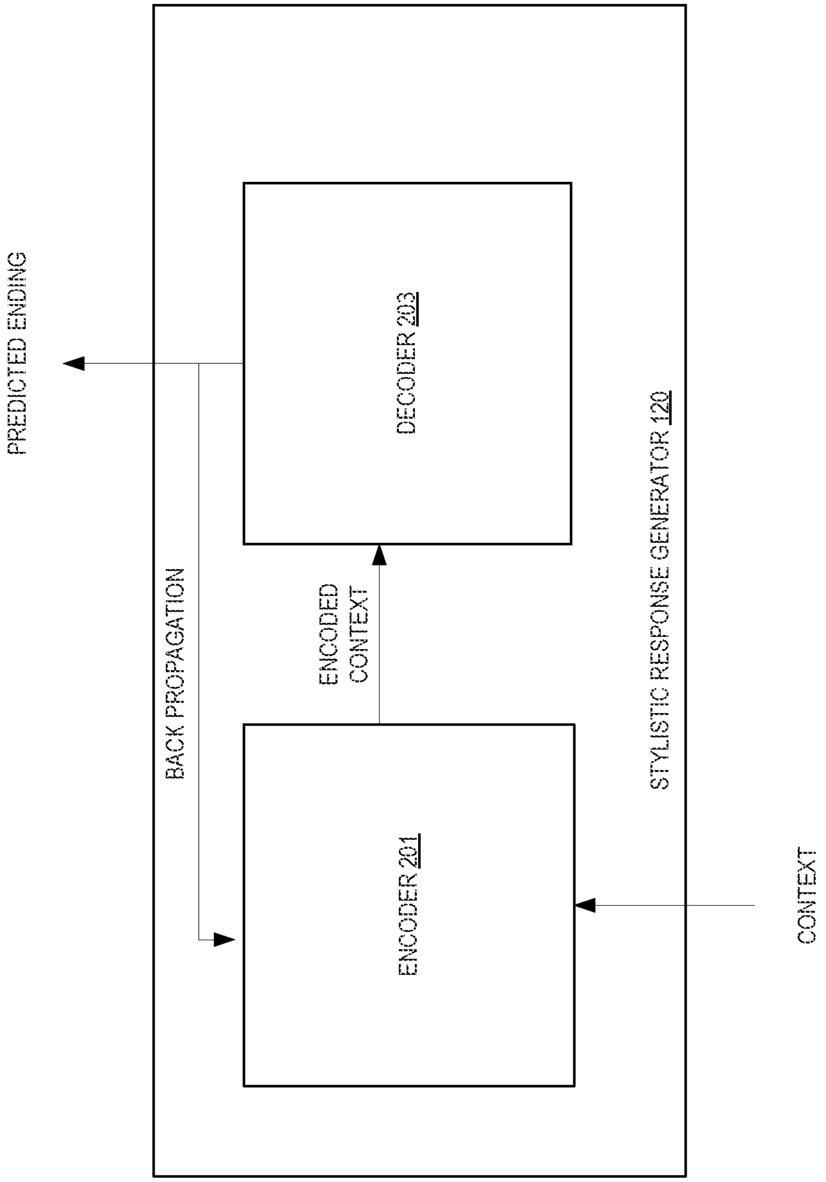
FIG. 2 illustrates examples of a stylistic response generator in a first training phase.

FIG. 2 illustrates examples of a stylistic response generator in a first training phase. In some examples, the stylistic response generator shown corresponds to the stylistic response generator 120 of FIG. 1. In this illustration, the stylistic response generator 120 comprises an encoder 201 and a decoder 203. The encoder/decoder model is trained to learn to predict a stylistic response (e.g., an ending) based on context provided to it. In some examples, the encoder 201 is a Transformer-based encoder (such as a Bidirectional Encoder Representations from Transformers (BERT) encoder) and/or the decoder 203 is a GPT-2 decoder.

The encoder 201 receives the context (e.g., of a story) and generates encoder embeddings ($\text{Enc}_{emb}$). These embeddings are provided the decoder 203 that is trained with teacher forcing using the ending. The training can be summarized as:

$$Enc_{emb} = BertEncoder(\text{Context})$$

$$P_t^V = \text{GPT\_2}(Enc_{emb}, \text{Response}_{1 \ldots t})$$

$$\text{loss}_{decoder} = \frac{1}{T_{decoder}} \sum_{t=1}^{T_{decoder}} -\log P(W_t^{true})$$

where the context is a collection of sentences or phrases, response is the model's response (e.g., an ending word-by-word) to the collection of sentences or phrases, and W represents a word in the response.

An example of a context and responses (endings) are as follows:

Context

Nicolas hated eating grapes a lot.

He had not eaten them since he was a kid.

One day, we went to a vineyard.

He saw so many grapes that he had to eat one.

Positive Style Ending

He was happy that he had finally tasted a new kind of fruit.

Negative Style Ending

In the first training phase, the styles of responses (e.g., positive, negative, right, wrong, happy, sad, angry, understanding, peaceful, non-technical, technical, etc.) are irrelevant. In some examples, the context and responses come from a large corpus such as the ROCStories corpus. In some examples, the response (ending) is the last sentence of a story.

Figure 3:
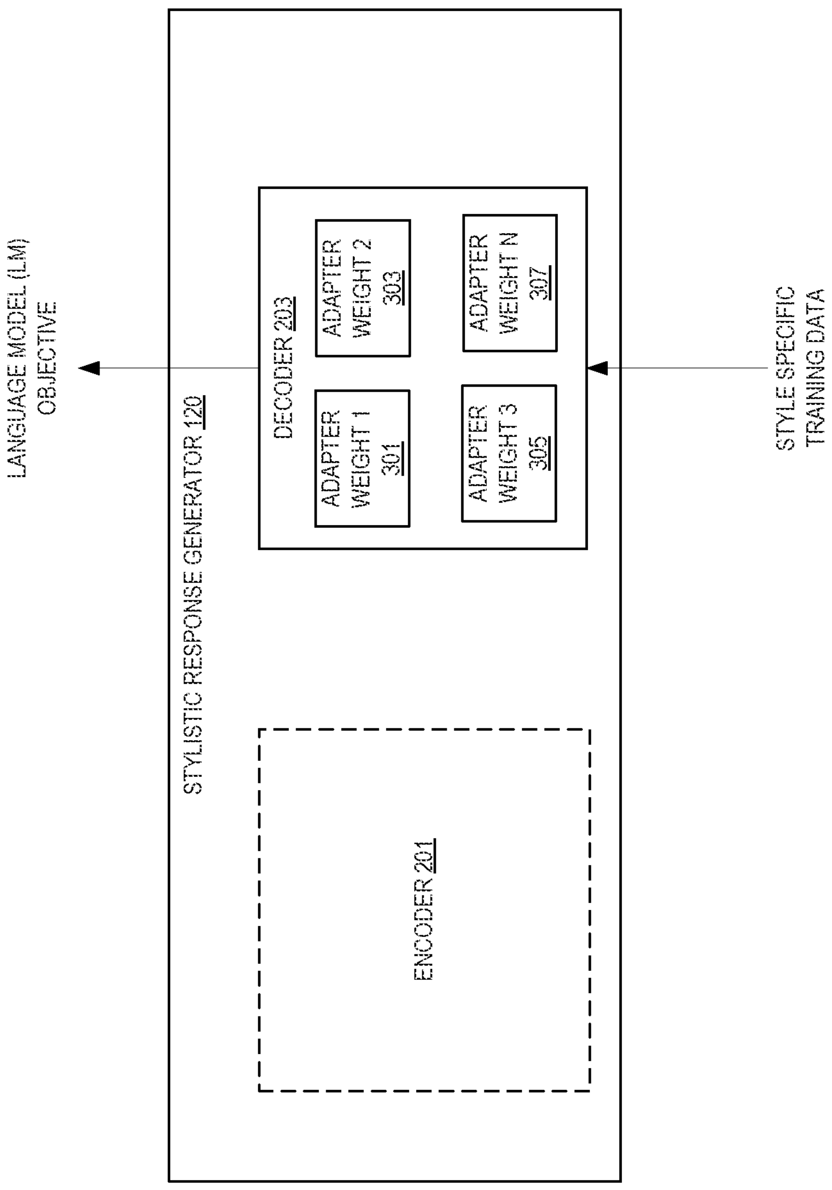
FIG. 3 illustrates examples of a stylistic response generator in a second training phase.

FIG. 3 illustrates examples of a stylistic response generator in a second training phase. In this phase, stylistic properties are learned. The encoder 201 is not involved in the training. In this training phase and adapter weights 301-307 of the decoder 203 are trained using style specific training data. Adapters are task specific layers that can be added to base ML (e.g., transformer) models to perform efficient transfer learning. Examples of adapters are plain, Houls, Peffier, parallel, invert, and/or compactor. Instead of having one big transformer model for each task (such as SST, SQUAD, etc.) the same base parameters of the decoder 203 are used, but the added task specific parameters (adapter weights) learn downstream tasks. The train adapter weights 301-307 are trained to learn these specific styles. In some examples, a style corpus is used to train only the adapter weights using a language model objective. In some examples, style specific adapters account for <1% of a model's parameters. To generate responses in different styles, all that should need to occur is the training of more style specific adapters for those different styles. In some examples, the style specific training data organizes data a tuple such as <persona, caption> where personas have been grouped to form styles.

Figure 4:
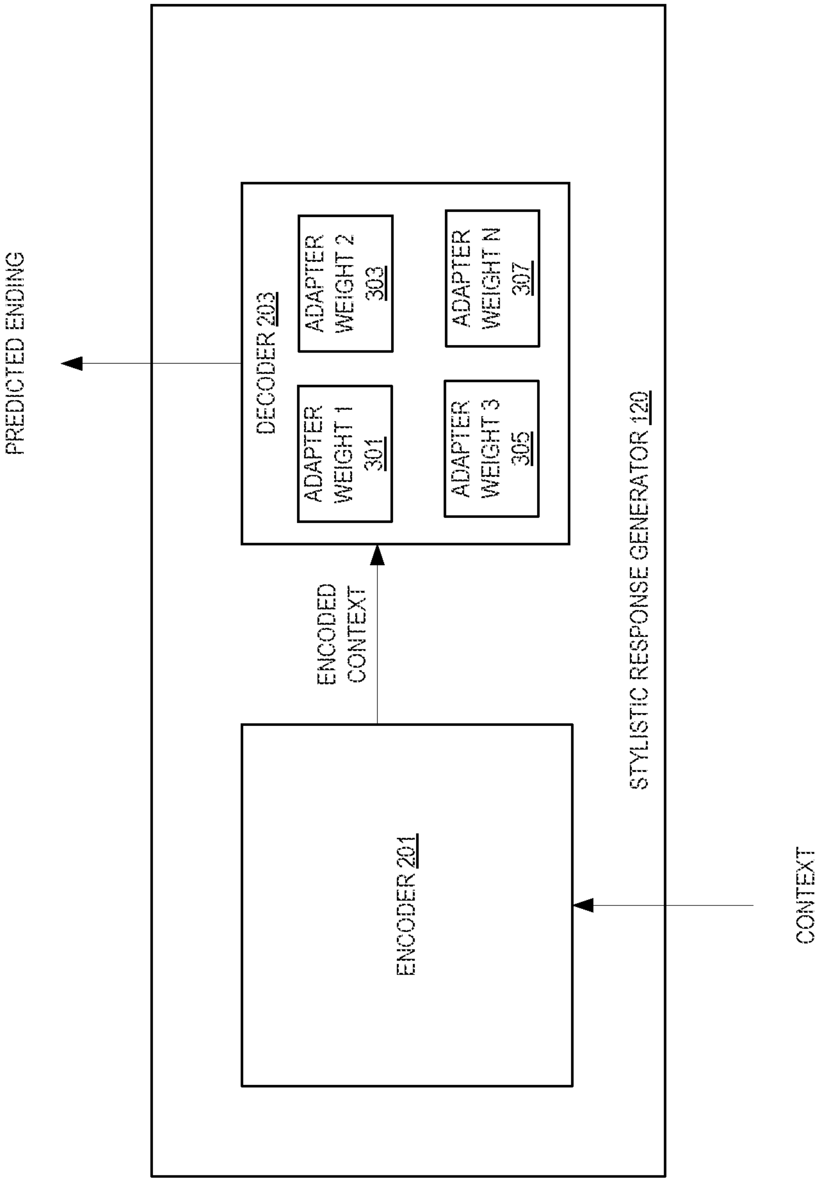
FIG. 4 illustrates examples of a stylistic response generator in a third training phase.

FIG. 4 illustrates examples of a stylistic response generator in a third training phase. While the adapter weights from the previous phase are trained to capture the stylistic aspect of language, the stylistic generator 120 has not been trained to complete stories, conversations, etc. In the third phase, called the relearning phase, the decoder 203 relearns to complete stories, conversations, etc. In this phase, the encoder 201 of phase one is attached to decoder 203 of phase 2 (with the adapter weights). Once this model is wired, only the adapter weights 301-307 for the task of story, conversation, etc. ending generation are trained using a loss function (e.g., the loss function defined above in equation 3). In some examples, the adapter weights should only be trained for a few steps with this objective as otherwise they may forget style aspects learned in phase 2. In this phase, in some examples, the context and responses come from a large corpus such as the ROCStories corpus and style is not relevant.

Figure 5:
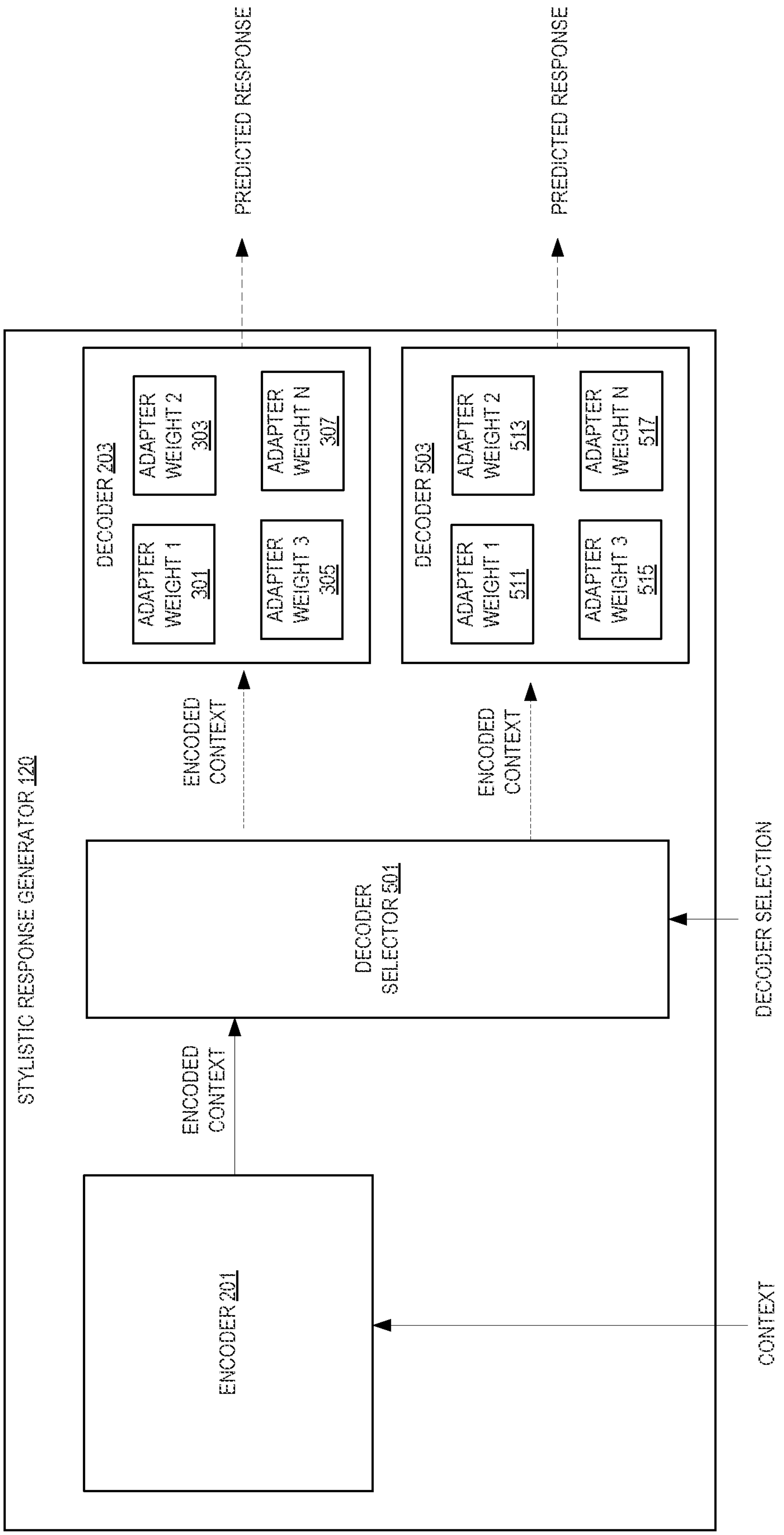
FIG. 5 illustrates examples of a stylistic response generator during inference where there are multiple decoders with different adapter weights.

FIG. 5 illustrates examples of a stylistic response generator during inference where there are multiple decoders with different adapter weights. The response generator 120 receives context information for the encoder 201 to encode. The context information may be many different types of information such as a conversation (including with a chatbot), a story, an article, etc.

The encoded context is provided to a decoder selector 501. The decoder selector 501 determines which decoder 203 (with weights 301-307) or decoder 503 (with weights 511-517) to use to predict a response (ending) based on a style (shown as decode selection) and sends the encoded context along as desired.

Figure 6:
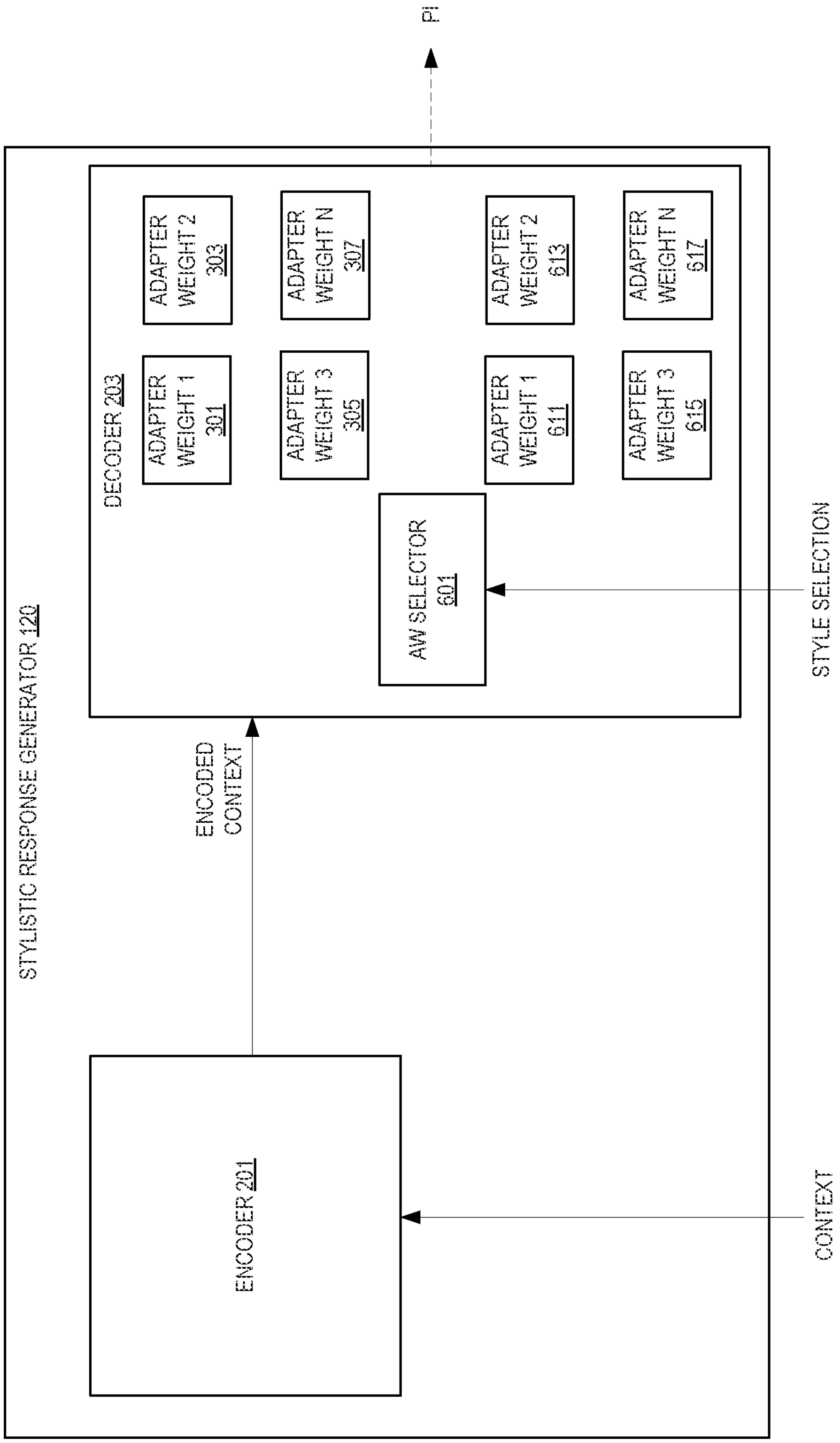
FIG. 6 illustrates examples of a stylistic response generator during inference where there is a single decoder with different adapter weights.

FIG. 6 illustrates examples of a stylistic response generator during inference where there is a single decoder with different adapter weights. The response generator 120 receives context information for the encoder 201 to encode. The context information may be many different types of information such as a conversation (including with a chatbot), a story, an article, etc.

The encoded context is provided to the decoder 203. An adapter weight selector 601 of the decoder 203 determines which weights 301-307 or weights 611-617 to use to predict a response (ending) based on a style (shown as style selection) and sends the encoded context along as desired.

Figure 7:
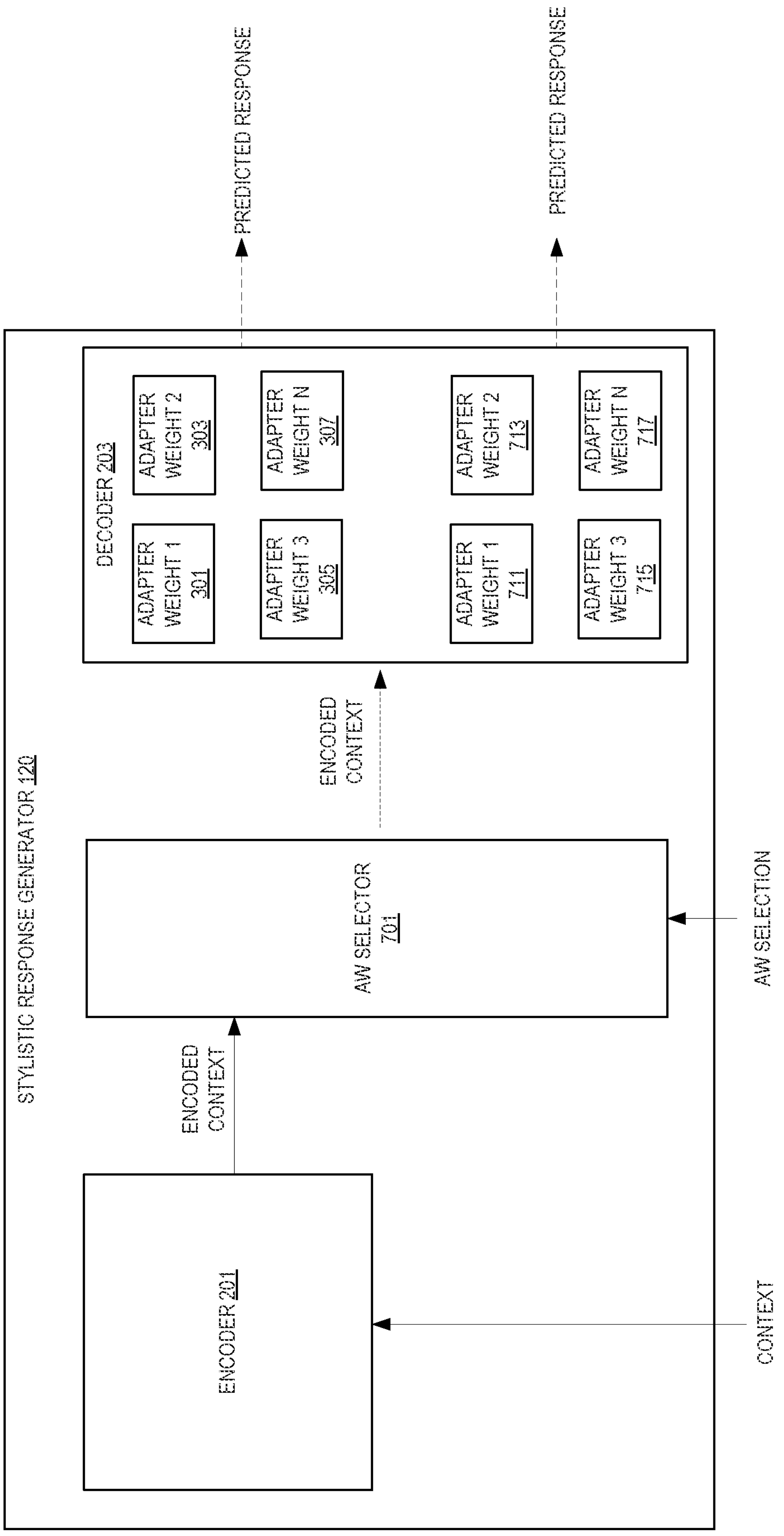
FIG. 7 illustrates examples of a stylistic response generator during inference where there is a single decoder with different adapter weights.

FIG. 7 illustrates examples of a stylistic response generator during inference where there is a single decoder with different adapter weights. The response generator 120 receives context information for the encoder 201 to encode. The context information may be many different types of information such as a conversation (including with a chatbot), a story, an article, etc.

The encoded context is provided to the decoder 203. An adapter weight selector 701 determines which weights 301-307 or weights 711-717 to use to predict a response (ending) based on a style (shown as style selection) and sends the encoded context along as desired to the proper weights of the decoder 203.

Figure 8:
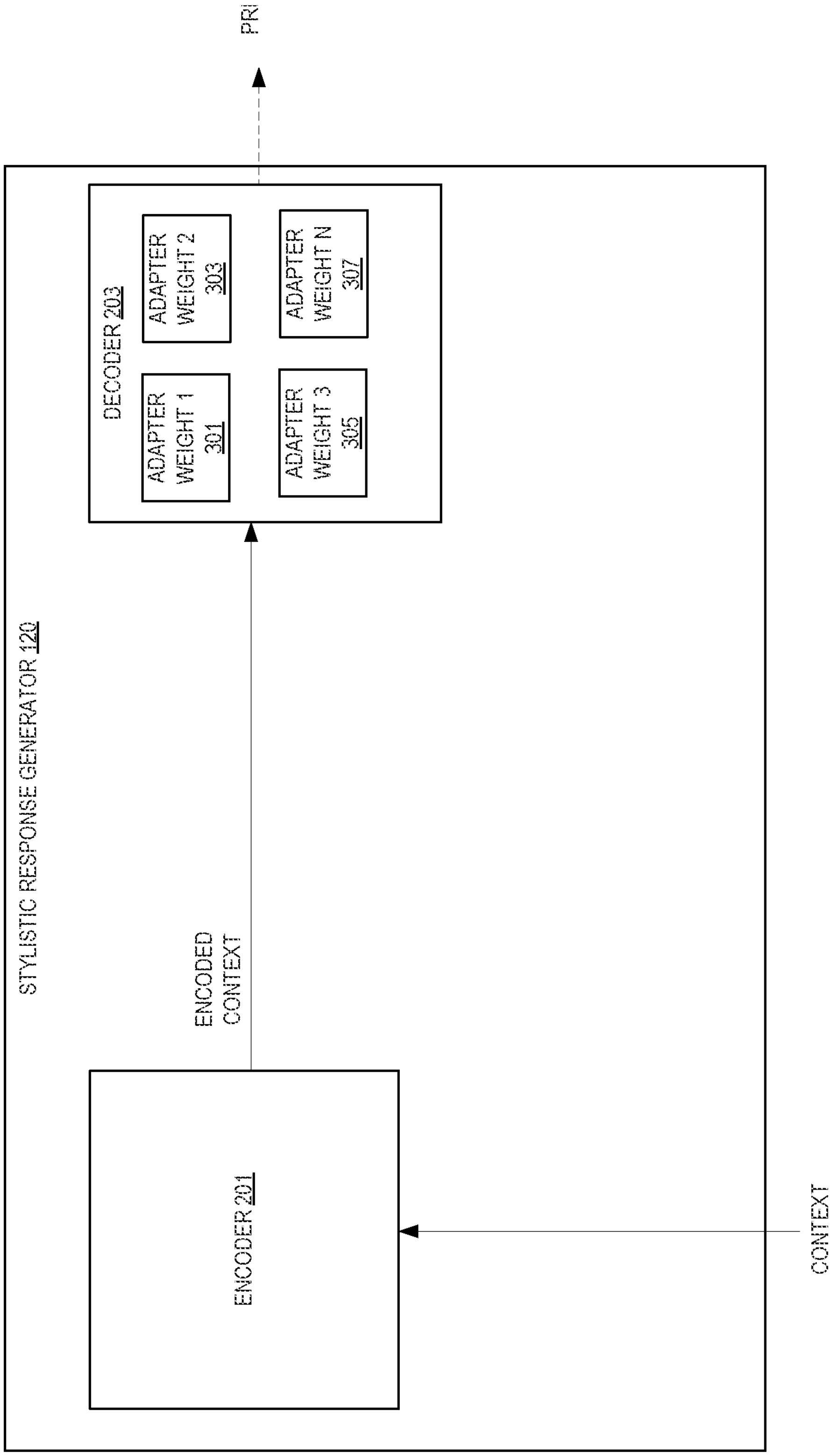
FIG. 8 illustrates examples of a stylistic response generator during inference where there is a single decoder.

FIG. 8 illustrates examples of a stylistic response generator during inference where there is a single decoder. The response generator 120 receives context information for the encoder 201 to encode. The context information may be many different types of information such as a conversation (including with a chatbot), a story, an article, etc.

The encoded context is provided to the decoder 203 which uses weights 301-307 to predict a response.

Figure 9:
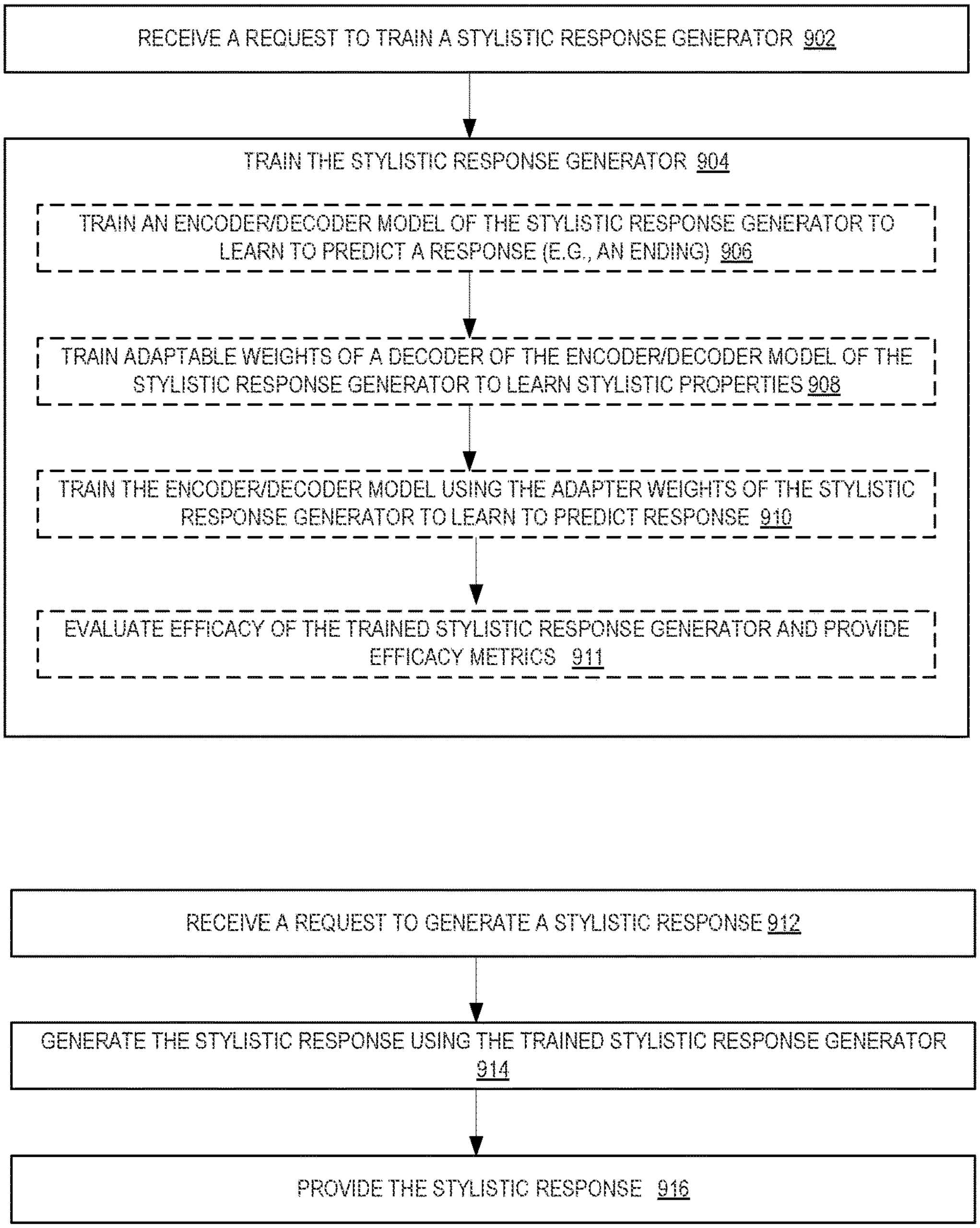
FIG. 9 is a flow diagram illustrating operations of a method for at least the training of a stylistic response generator and/or using a stylistic response generator according to some examples.

FIG. 9 is a flow diagram illustrating operations of a method for at least the training of a stylistic response generator and/or using a stylistic response generator according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by at least the stylistic response generator 120 of the other figures.

A request to train a stylistic response generator is received at 902. This request may include one or more of: an indication of a model to train, the model to train, an indication of where training data (both stylistic and content) to be used is found, an indication of where to store a trained model, an indication of a number of steps of training, etc.

The stylistic response generator is trained at 904 in response to the requestion. This training may include several acts.

An encoder/decoder model of the stylistic response generator is trained to learn to predict a response (e.g., an ending) at 906. A discussion of this first phase has been detailed above.

Adapter weights of a decoder of the encoder/decoder model of the stylistic response generator are trained to learn stylistic properties at 908. A discussion of this second phase has been detailed above.

The encoder/decoder model using the adapter weights of the stylistic response generator is trained to learn to predict response at 910. A discussion of this third phase has been detailed above.

In some examples, the efficacy of the trained stylistic response generated is evaluated and efficacy metrics are provided as output at 911. In some examples, the stopping of the training is done automatically based on the generated metrics.

In some examples, inference using the trained stylistic response generator is performed. In some examples, a request to generate a stylistic response generator is received at 912. In some examples, this request includes indication of a style to use. In some examples, the style to use is inferred or learned from contextual information such as a present conversation, past interactions, etc. In some examples, a machine learning model makes this inference.

A stylistic response is generated using the trained stylistic response generator at 914 and provided at 916. For example, a response is generated and provided as a chatbot interaction.

Figure 10:
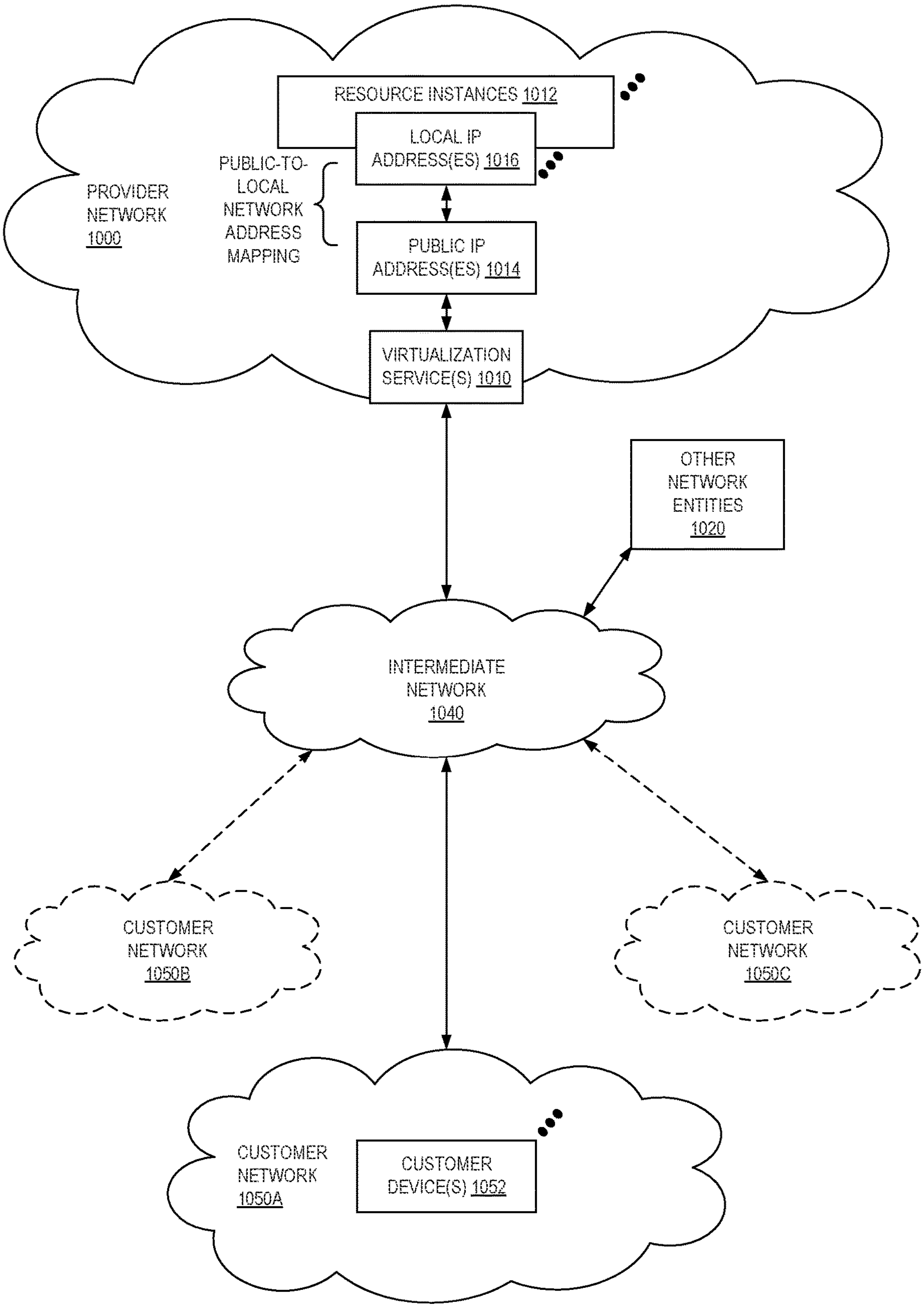
FIG. 10 illustrates an example provider network environment according to some examples.

FIG. 10 illustrates an example provider network (or "service provider system") environment according to some examples. A provider network 1000 can provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 can be associated with the resource instances 1012; the local IP addresses are the internal network addresses of the resource instances 1012 on the provider network 1000. In some examples, the provider network 1000 can also provide public IP addresses 1014 and/or public IP address ranges (e.g., Internet Protocol version 4 (IPv4) or Internet Protocol version 6 (IPv6) addresses) that customers can obtain from the provider 1000.

Conventionally, the provider network 1000, via the virtualization services 1010, can allow a customer of the service provider (e.g., a customer that operates one or more customer networks 1050A-1050C (or "client networks") including one or more customer device(s) 1052) to dynamically associate at least some public IP addresses 1014 assigned or allocated to the customer with particular resource instances 1012 assigned to the customer. The provider network 1000 can also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of the customer network(s) 1050A-1050C can, for example, implement customer-specific applications and present the customer's applications on an intermediate network 1040, such as the Internet. Other network entities 1020 on the intermediate network 1040 can then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 can be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1000; a customer can then assign their allocated public IP addresses to particular resource instances allocated to the customer. These public IP addresses can be referred to as customer public IP addresses, or simply customer IP addresses. Instead of being assigned by the provider network 1000 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
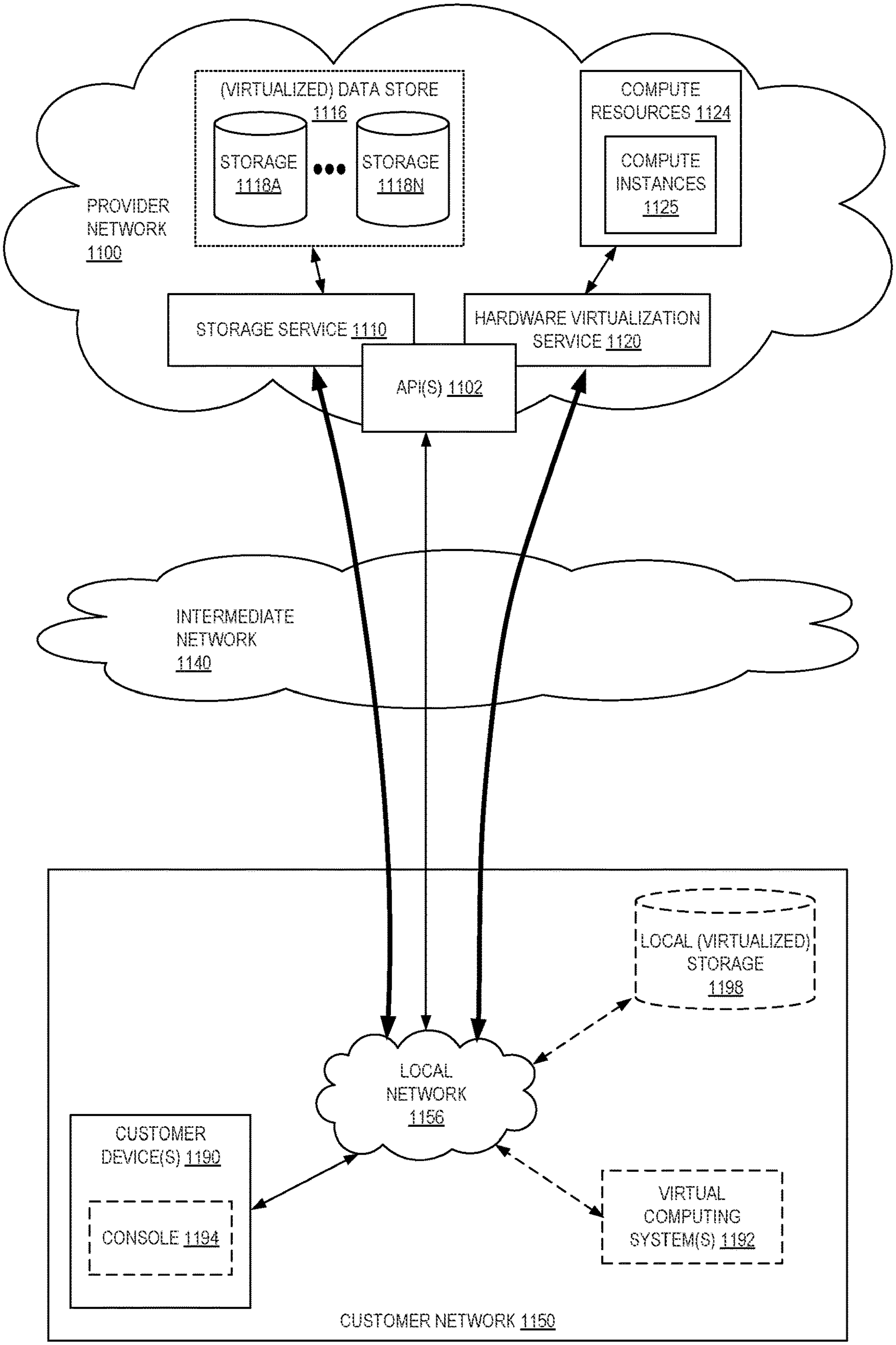
FIG. 11 is a block diagram of an example provider network that provides a storage service and a hardware virtualization service to customers according to some examples.

FIG. 11 is a block diagram of an example provider network environment that provides a storage service and a hardware virtualization service to customers, according to some examples. A hardware virtualization service 1120 provides multiple compute resources 1124 (e.g., compute instances 1125, such as VMs) to customers. The compute resources 1124 can, for example, be provided as a service to customers of a provider network 1100 (e.g., to a customer that implements a customer network 1150). Each computation resource 1124 can be provided with one or more local IP addresses. The provider network 1100 can be configured to route packets from the local IP addresses of the compute resources 1124 to public Internet destinations, and from public Internet sources to the local IP addresses of the compute resources 1124.

The provider network 1100 can provide the customer network 1150, for example coupled to an intermediate network 1140 via a local network 1156, the ability to implement virtual computing systems 1192 via the hardware virtualization service 1120 coupled to the intermediate network 1140 and to the provider network 1100. In some examples, the hardware virtualization service 1120 can provide one or more APIs 1102, for example a web services interface, via which the customer network 1150 can access functionality provided by the hardware virtualization service 1120, for example via a console 1194 (e.g., a web-based application, standalone application, mobile application, etc.) of a customer device 1190. In some examples, at the provider network 1100, each virtual computing system 1192 at the customer network 1150 can correspond to a computation resource 1124 that is leased, rented, or otherwise provided to the customer network 1150.

From an instance of the virtual computing system(s) 1192 and/or another customer device 1190 (e.g., via console 1194), the customer can access the functionality of a storage service 1110, for example via the one or more APIs 1102, to access data from and store data to storage resources 1118A-1118N of a virtual data store 1116 (e.g., a folder or "bucket," a virtualized volume, a database, etc.) provided by the provider network 1100. In some examples, a virtualized data store gateway (not shown) can be provided at the customer network 1150 that can locally cache at least some data, for example frequently accessed or critical data, and that can communicate with the storage service 1110 via one or more communications channels to upload new or modified data from a local cache so that the primary store of data (the virtualized data store 1116) is maintained. In some examples, a user, via the virtual computing system 1192 and/or another customer device 1190, can mount and access virtual data store 1116 volumes via the storage service 1110 acting as a storage virtualization service, and these volumes can appear to the user as local (virtualized) storage 1198.

While not shown in FIG. 11, the virtualization service(s) can also be accessed from resource instances within the provider network 1100 via the API(s) 1102. For example, a customer, appliance service provider, or other entity can access a virtualization service from within a respective virtual network on the provider network 1100 via the API(s) 1102 to request allocation of one or more resource instances within the virtual network or within another virtual network.

Illustrative Systems

Figure 12:
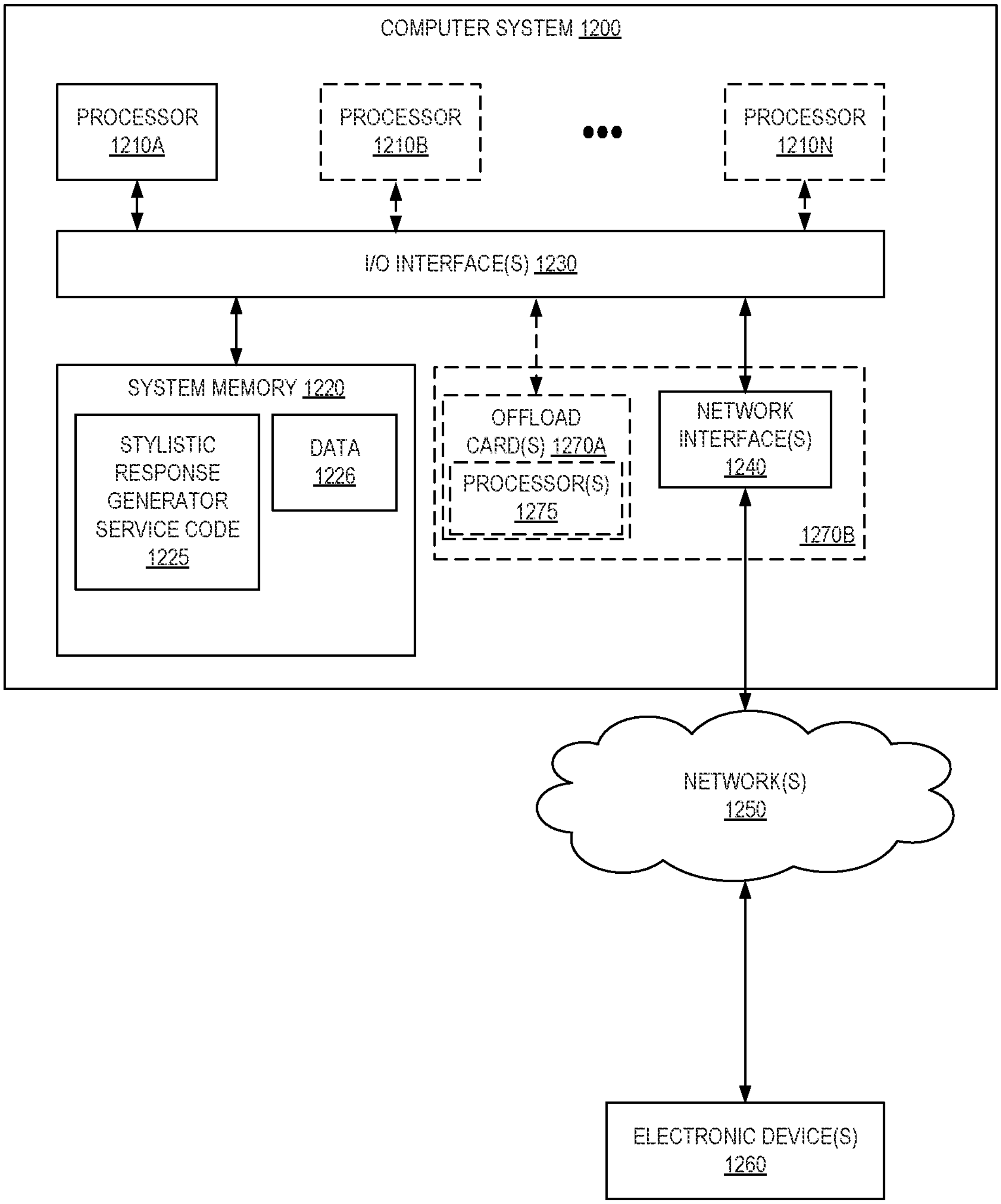
FIG. 12 is a block diagram illustrating an example computer system that can be used in some examples.

In some examples, a system that implements a portion or all of the techniques described herein can include a general-purpose computer system, such as the computer system 1200 illustrated in FIG. 12, that includes, or is configured to access, one or more computer-accessible media. In the illustrated example, the computer system 1200 includes one or more processors 1210 coupled to a system memory 1220 via an input/output (I/O) interface 1230. The computer system 1200 further includes a network interface 1240 coupled to the I/O interface 1230. While FIG. 12 shows the computer system 1200 as a single computing device, in various examples the computer system 1200 can include one computing device or any number of computing devices configured to work together as a single computer system 1200.

In various examples, the computer system 1200 can be a uniprocessor system including one processor 1210, or a multiprocessor system including several processors 1210 (e.g., two, four, eight, or another suitable number). The processor(s) 1210 can be any suitable processor(s) capable of executing instructions. For example, in various examples, the processor(s) 1210 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1210 can commonly, but not necessarily, implement the same ISA.

The system memory 1220 can store instructions and data accessible by the processor(s) 1210. In various examples, the system memory 1220 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1220 as stylistic response generator service code 1225 (e.g., executable to implement, in whole or in part, the stylistic response generator service 120) and data 1226.

In some examples, the I/O interface 1230 can be configured to coordinate I/O traffic between the processor 1210, the system memory 1220, and any peripheral devices in the device, including the network interface 1240 and/or other peripheral interfaces (not shown). In some examples, the I/O interface 1230 can perform any necessary protocol, timing, or other data transformations to convert data signals from one component (e.g., the system memory 1220) into a format suitable for use by another component (e.g., the processor 1210). In some examples, the I/O interface 1230 can include support for devices attached through various types of peripheral buses, such as a variant of the Peripheral Component Interconnect (PCI) bus standard or the Universal Serial Bus (USB) standard, for example. In some examples, the function of the I/O interface 1230 can be split into two or more separate components, such as a north bridge and a south bridge, for example. Also, in some examples, some or all of the functionality of the I/O interface 1230, such as an interface to the system memory 1220, can be incorporated directly into the processor 1210.

The network interface 1240 can be configured to allow data to be exchanged between the computer system 1200 and other devices 1260 attached to a network or networks 1250, such as other computer systems or devices as illustrated in FIG. 1, for example. In various examples, the network interface 1240 can support communication via any suitable wired or wireless general data networks, such as types of Ethernet network, for example. Additionally, the network interface 1240 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1200 includes one or more offload cards 1270A or 1270B (including one or more processors 1275, and possibly including the one or more network interfaces 1240) that are connected using the I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1200 can act as a host electronic device (e.g., operating as part of a hardware virtualization service) that hosts compute resources such as compute instances, and the one or more offload cards 1270A or 1270B execute a virtualization manager that can manage compute instances that execute on the host electronic device. As an example, in some examples the offload card(s) 1270A or 1270B can perform compute instance management operations, such as pausing and/or un-pausing compute instances, launching and/or terminating compute instances, performing memory transfer/copying operations, etc. These management operations can, in some examples, be performed by the offload card(s) 1270A or 1270B in coordination with a hypervisor (e.g., upon a request from a hypervisor) that is executed by the other processors 1210A-1210N of the computer system 1200. However, in some examples the virtualization manager implemented by the offload card(s) 1270A or 1270B can accommodate requests from other entities (e.g., from compute instances themselves), and cannot coordinate with (or service) any separate hypervisor.

In some examples, the system memory 1220 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1200 via the I/O interface 1230. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1200 as the system memory 1220 or another type of memory. Further, a computer-accessible medium can include transmission media or signals such as electrical, electromagnetic, or digital signals, conveyed via a communication medium such as a network and/or a wireless link, such as can be implemented via the network interface 1240.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
receiving a request to train a stylistic response generator;
training the stylistic response generator by:
training an encoder and multiple decoders of the stylistic response generator to learn to predict responses, the multiple decoders of the stylistic response generator having different adapter weights,
training the different adapter weights of the decoders of the stylistic response generator to learn stylistic properties based on a language model objective, and
training the decoders using the different adapter weights and the encoder of the stylistic response generator to learn to predict responses; and
using the trained stylistic response generator to generate a stylistic response in response to a query by:
receiving, by the trained stylistic response generator, context information;
encoding, by the encoder of the stylistic response generator, the context information to generate encoded context;
providing the encoded context to a decoder selector of the stylistic response generator;
determining, by the decoder selector, which of the decoders to use to predict the stylistic response based on a style; and
sending the encoded context to a selected one of the decoders.

2. The computer-implemented method of claim 1, wherein the encoder and the decoders are Transformer-based.

3. The computer-implemented method of claim 1, wherein the request includes one or more of an indication of a model to train, the model to train, an indication of where training data to be used is found, an indication of where to store a trained model, or an indication of a number of steps of training.

4. A computer-implemented method comprising:
receiving a request to train a stylistic response generator, the request including an indication of a plurality of styles to use to train the stylistic response generator;
training an encoder and a decoder of the stylistic response generator to generate responses according to the plurality of styles, the decoder of the stylistic response generator having different adapter weights; and
using the trained stylistic response generator to generate a stylistic response in response to a query by:
receiving, by the trained stylistic response generator, context information;
encoding, by the encoder of the stylistic response generator, the context information to generate encoded context;
providing the encoded context to an adapter weight selector of the stylistic response generator;
determining, by the adapter weight selector, which of the different adapter weights to use to predict the stylistic response based on a style; and sending the encoded context to selected ones of the different adapter weights.

5. The computer-implemented method of claim 4, wherein training the encoder and the decoder with different adapter weights of the stylistic response generator to generate responses according to the plurality of styles comprises:

training the encoder and the decoder of the stylistic response generator to learn to predict responses, training the different adapter weights of the decoder of the stylistic response generator to learn stylistic properties based on a language model objective, and training the decoder using the different adapter weights and the encoder of the stylistic response generator to learn to predict responses, wherein the different adapter weights are task specific.

6. The computer-implemented method of claim 5, wherein the decoder is trained using teacher forcing.

7. The computer-implemented method of claim 5, wherein the decoder is trained using style specific training data.

8. The computer-implemented method of claim 5, wherein training the decoder does not include training the encoder.

9. The computer-implemented method of claim 5, wherein the encoder and the decoder are Transformer-based.

10. The computer-implemented method of claim 4, wherein the request includes one or more of an indication of a model to train, the model to train, an indication of where training data to be used is found, an indication of where to store a trained model, or an indication of a number of steps of training.

11. The computer-implemented method of claim 4, wherein a style to use in the generating the stylistic response using the trained stylistic response generator is selected based at least in part on contextual information.

12. The computer-implemented method of claim 4, wherein the request to generate a stylistic response is received from a chatbot.

13. The computer-implemented method of claim 4, wherein the request to generate a stylistic response indicates a style preference.

14. The computer-implemented method of claim 4, wherein training the encoder and the decoder with different adapter weights of the stylistic response generator to generate responses according to the plurality of styles comprises generating metrics for the stylistic response generator and evaluating an efficacy of the stylistic response generator based on the metrics.

15. The computer-implemented method of claim 14, wherein training the encoder and the decoder with different adapter weights of the stylistic response generator to generate responses according to the plurality of styles is stopped automatically based on the metrics.

16. The system of claim 14, wherein the request includes one or more of an indication of a model to train, the model to train, an indication of where training data to be used is found, an indication of where to store a trained model, or an indication of a number of steps of training.

17. The system of claim 14, wherein a style to use in generating a stylistic response using the trained stylistic response generator is selected based at least in part on contextual information.

18. The system of claim 14, wherein the stylistic response generator is a Transformer-based model.

19. The system of claim 14, wherein the decoder is trained using teacher forcing.

20. A system comprising:

a first one or more electronic devices implementing a chatbot service in a multi-tenant provider network; and a second one or more electronic devices implementing a stylistic response generator service in the multi-tenant provider network, the stylistic response generator service implemented as code stored in memory that upon execution by one or more processors of the stylistic response generator service cause the stylistic response generator service to:

receive a request to train a stylistic response generator, the request including an indication of a plurality of styles to use to train the stylistic response generator; and train an encoder and a decoder of the stylistic response generator to generate responses according to the plurality of styles, the decoder of the stylistic response generator having different adapter weights; and use the trained stylistic response generator to generate a stylistic response for a chat session of the chatbot service by:

receiving, by the trained stylistic response generator, context information;

encoding, by the encoder of the stylistic response generator, the context information to generate encoded context;

providing the encoded context to an adapter weight selector of the stylistic response generator;

determining, by the adapter weight selector, which of the different adapter weights to use to predict the stylistic response based on a style; and sending the encoded context to selected ones of the different adapter weights.

* * * * *